US010922101B2

(12) United States Patent
DiMascio et al.

(10) Patent No.: US 10,922,101 B2
(45) Date of Patent: Feb. 16, 2021

(54) USER INTERFACE WIDGET RECOMMENDATION

(71) Applicant: International Business Machines Corporation, Armonk, NY (US)

(72) Inventors: Carmine M. DiMascio, West Roxbury, MA (US); Florian Pinel, New York, NY (US); Donna K. Byron, Petersham, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/452,650

(22) Filed: Jun. 26, 2019

(65) Prior Publication Data
US 2020/0409724 A1 Dec. 31, 2020

(51) Int. Cl.
*G06F 3/048* (2013.01)
*G06F 9/451* (2018.01)
*G06N 20/00* (2019.01)
*G06F 3/0481* (2013.01)
*G06K 9/00* (2006.01)
*G06F 40/14* (2020.01)
*G06F 40/20* (2020.01)

(52) U.S. Cl.
CPC .......... *G06F 9/451* (2018.02); *G06F 3/04817* (2013.01); *G06F 40/14* (2020.01); *G06F 40/20* (2020.01); *G06K 9/00463* (2013.01); *G06N 20/00* (2019.01); *G06K 2209/01* (2013.01)

(58) Field of Classification Search
CPC .......... G06F 9/451; G06F 40/20; G06F 40/14; G06F 3/04817; G06N 20/00; G06K 9/00463

USPC .......................................................... 715/760
See application file for complete search history.

(56) References Cited

U.S. PATENT DOCUMENTS

| 8,572,560 | B2 | 10/2013 | Drissi et al. |
| 8,595,186 | B1 | 11/2013 | Mandyam et al. |
| 9,519,464 | B2 | 12/2016 | Dang et al. |
| 9,619,211 | B2 | 4/2017 | McCollum et al. |
| 9,773,264 | B2 * | 9/2017 | Brown ................ G06F 3/04817 |

(Continued)

FOREIGN PATENT DOCUMENTS

KR 1020100003117 A1 1/2010

OTHER PUBLICATIONS

Conceicao et al., "Streamlining Code Smells: Using Collective Intelligence and Visualization", 2014 9th International Conference on the Quality of Information and Communications Technology, QUATIC 2014, Sep. 23-26, 2014, Guimaraes, Portugal, pp. 306-311.

(Continued)

*Primary Examiner* — David Phantana-angkool
(74) *Attorney, Agent, or Firm* — Sonny Z. Zhan

(57) ABSTRACT

In an approach for user interface widget recommendation, a processor receives a plurality of widgets. A processor applies natural language processing to the plurality of widgets to determine features wherein the features include contexts and layouts associated with the plurality of widgets. A processor trains a widget classifier based on the determined features. The widget classifier predicts a widget type. A processor trains a component classifier based on the widget type associated with the determined features. The component classifier predicts a component type and a component element type.

12 Claims, 6 Drawing Sheets

(56) References Cited

U.S. PATENT DOCUMENTS

| | | | | |
|---|---|---|---|---|
| 9,794,374 | B2* | 10/2017 | Singh | H04L 67/02 |
| 9,799,005 | B2* | 10/2017 | Murray | G06Q 10/10 |
| 9,942,358 | B2* | 4/2018 | Babu | H04L 67/36 |
| 9,971,585 | B2* | 5/2018 | Walker | G06F 8/52 |
| 9,974,045 | B2* | 5/2018 | Ghosh | H04L 67/22 |
| 10,091,628 | B2* | 10/2018 | Nirantar | G06F 9/547 |
| 2009/0150388 | A1 | 6/2009 | Roseman et al. | |
| 2010/0251174 | A1 | 9/2010 | Belandrino | |
| 2011/0282888 | A1 | 11/2011 | Koperski et al. | |
| 2012/0042036 | A1* | 2/2012 | Lau | H04W 4/60 |
| | | | | 709/217 |
| 2013/0275892 | A1 | 10/2013 | Li et al. | |
| 2017/0010790 | A1* | 1/2017 | Glover | G06F 3/14 |
| 2017/0041437 | A1* | 2/2017 | Singh | G06F 3/0482 |
| 2017/0046024 | A1* | 2/2017 | Dascola | G06F 3/04817 |
| 2017/0185617 | A1* | 6/2017 | Nirantar | H04W 4/60 |
| 2017/0358113 | A1* | 12/2017 | Bray | G06T 3/40 |

OTHER PUBLICATIONS

IBM et al, "Shareable Code System", An IP.com Prior Art Database Technical Disclosure, Published Mar. 5, 2008, IP.com No. IPCOM000168308D, 2 pages.

IBM et al., "Method and Technique for Mining UI Patterns", An IP.com Prior Art Database Technical Disclosure, Published Aug. 13, 2007, IP.com No. IPCOM000157083D, 5 pages.

Mell et al., "The NIST Definition of Cloud Computing", Recommendations of the National Institute of Standards and Technology, Special Publication 800-145, Sep. 2011, 7 pages.

* cited by examiner

USER INTERFACE WIDGET RECOMMENDATION

BACKGROUND

The present disclosure relates generally to the field of user interfaces, and more particularly to user interface widget recommendation.

User interface is a place where interactions between a user and a computer occur. User interface allows effective operation and control of a computer from the user, while the computer simultaneously feeds back information that aids a user's decision-making process. Many user interface design applications have been developed for users to create user interface designs.

SUMMARY

Aspects of an embodiment of the present disclosure disclose an approach for user interface widget recommendation. A processor receives a plurality of widgets. A processor applies natural language processing to the plurality of widgets to determine features wherein the features include contexts and layouts associated with the plurality of widgets. A processor trains a widget classifier based on the determined features. The widget classifier predicts a widget type. A processor trains a component classifier based on the widget type associated with the determined features. The component classifier predicts a component type and a component element type.

DETAILED DESCRIPTION

The present disclosure is directed to systems and methods for user interface widget recommendation.

There are numerous ways to develop a user interface. The present disclosure recognizes that a user needs to create good user experiences by recommending new or alternative widgets to suit the user's needs. A user interface widget may be an ensemble of components that perform a specific user function. The present disclosure recognizes providing real-time widget suggestions throughout a widget design process. The present disclosure recognizes collecting user interface widgets, gathering groups of components that collectively comprise a user interface widget, training models and heuristics to identify widgets, and recommending appropriate widgets to users as they design their own user interfaces. The present disclosure recognizes the ability to understand the context of what the user is designing and developing, and to provide alternative widget recommendations. User input is utilized to provide additional information about a widget context. Widgets may be recommended based on commonly used other widgets.

Figure 1:
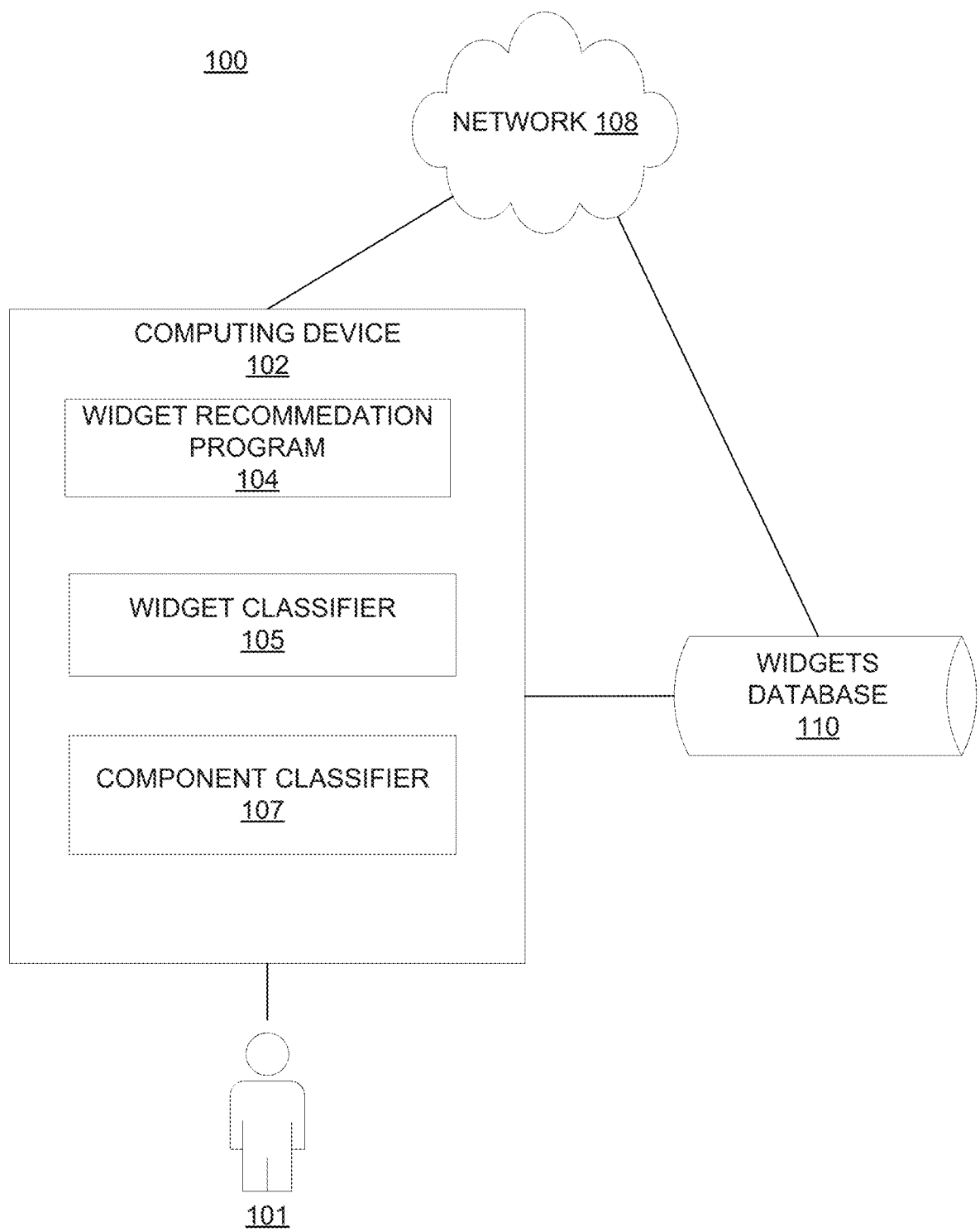
FIG. 1 is a functional block diagram illustrating a user interface development environment, in accordance with an embodiment of the present disclosure.

The present disclosure will now be described in detail with reference to the Figures. FIG. 1 is a functional block diagram illustrating a user interface development environment, generally designated 100, in accordance with an embodiment of the present disclosure.

In the depicted embodiment, user interface development environment 100 includes computing device 102, network 108, and widgets database 110. Widgets database 110 is a database that includes widgets from various sources. For example, widgets database 110 may include large libraries of widgets available in open source software projects. Widgets database 110 may include resources of widgets where people select areas in a user interface (e.g., mobile, desktop, or web) and where people collect widgets. In the depicted embodiment, widgets database 110 is located externally and may be accessed through a communication network such as network 108. However, in other embodiments, widgets database 110 is located on computing device 102. In an example, widgets database 110 may be accessed directly from computing device 102. In another example, widgets database 110 may be accessed through network 108.

In various embodiments of the present disclosure, computing device 102 can be a laptop computer, tablet computer, netbook computer, personal computer (PC), desktop computer, mobile phone, smartphone, smart watch, wearable computing device, personal digital assistant (PDA), or server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to widget recommendation program 104, widget classifier 105, component classifier 107, network 108, and widgets database 110, and is capable of processing program instructions and executing widget recommendation program 104, in accordance with an embodiment of the present disclosure. Computing device 102 may include internal and external hardware components, as depicted and described in further detail with respect to FIG. 4.

Further, in the depicted embodiment, computing device 102 includes widget recommendation program 104, widget classifier 105, and component classifier 107. In the depicted embodiment, widget recommendation program 104, widget classifier 105, and component classifier 107 are located on computing device 102. However, in other embodiments, widget recommendation program 104, widget classifier 105, and component classifier 107 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102, widget recommendation program 104, widget classifier 105, and component classifier 107, in accordance with a desired embodiment of the disclosure.

Widget recommendation program 104 is configured to receive a plurality of widgets for analysis from widgets database 110. A widget is generally a software application that is designed to provide a specific piece of information or a specific function on demand. A user interface widget is, for example, a software application that a computer user interacts with through direct manipulation to read or edit information about an application. A widget may facilitate a specific type of user-computer interaction and may appear as a visible part of the application's graphical user interface. A widget may include one or more components that perform a specific user function. As discussed above, widgets database 110 is a database that includes widgets from various sources. For example, widgets database 110 may include large libraries of widgets available in open source software projects. Widgets database 110 may include resources of widgets where people select areas in a user interface (e.g., mobile, desktop, or web) and where people provide a name for widgets that they collect.

Widget recommendation program 104 is configured to apply natural language processing to the plurality of widgets to determine features wherein the features include contexts and layouts associated with the plurality of widgets. Natural language processing may include natural language classifying, natural language understanding, optical character recognition, and any other natural language processing techniques with analyzing, understanding, and generating natural human languages to interface with machines, for example, both in written and spoken forms. In an example, contexts are texts associated with the plurality of widgets. In another example, contexts are imagery associated with the plurality of widgets. The features may also include layouts and components of the plurality of widgets.

In an example, the plurality of widgets can be represented and encoded via a declarative syntax, for example, Hyper Text Markup Language (HTML) on the web, or JavaScript Extensible Markup Language (JSX) for modern mobile frameworks, for example, React Native. Widget recommendation program 104 can identify widgets by extracting layouts of the HTML to identify components by identifying grouped items and extracting the labeled text and icons to infer contexts. For example, multiple form fields including first name, last name, address, zip code, city, state and a submit button may represent a widget to collect a user's address. Using heuristics, widget recommendation program 104 can identify many different types of widgets. In another example, for non-declarative widgets, widget recommendation program 104 can use computer vision techniques or optical character recognition (OCR) to identify components in the widgets. For example, widget recommendation program 104 can use background color and edge detection to find clusters of elements and the defining widget. This detection can be done by differentiating nearby pixels. Once widget recommendation program 104 identifies a space that the widget occupies, widget recommendation program 104 can use OCR to detect the text in each component of a widget, and thus the associated context. For example, from an address widget, OCR may capture text such as "Name", "Street", "Zip Code", "City", "State", and a "Submit" button.

Widget recommendation program 104 is configured to train widget classifier 105 based on features which include contexts and layouts associated with the plurality of widgets. Widget recommendation program 104 trains widget classifier 105 to predict a widget type from the contexts and layouts associated with the plurality of widgets as discussed above. For each classified widget, widget recommendation program 104 may extract a feature such as color, font, style, and structural/layout, using the HTML structure or computer vision. Widget recommendation program 104 trains component classifier 107 based on the widget type associated with the determined features to predict a component type and a component element type of the basic elements such as buttons, input boxes, sliders, and labels. In an example, widget recommendation program 104 provides friendly names to widget classes, locates headers in each class element, and does a ranking based on a majority vote.

Widget recommendation program 104 is configured to present a widget to user 101 based on widget classifier 105, component classifier 107, and an input of user 101. For example, user 101 may work with a design tool on a mobile application, a web application, a desktop application, or any other type of software application. When user 101 interacts with widget components during the user interface design process, widget recommendation program 104 may identify the location of the interaction determined by, for example, a mouse click, touch, or eye tracking of user 101. Widget recommendation program 104 may identify a nearby widget based on the location of the user interaction. Widget recommendation program 104 may further extract the nearby widget by edge detection and classification techniques. The identified widget may be an input to further train widget classifier 105 and component classifier 107.

Widget recommendation program 104 may perform an inference operation to identify relative components for the identified widget. In an example, widget recommendation program 104 leverages various machine learning approaches to cluster and collaboratively filter relative components for the identified widget. In an embodiment, widget recommendation program 104 provides suggestions that are similar in both context and layout for the identified widget. In another embodiment, widget recommendation program 104 recommends components with a different layout but similar context for the identified widget. In yet another embodiment, widget recommendation program 104 recommends components with a different context but similar layouts for the identified widget. Recommendation for similar concepts but different layout and/or color palettes can be useful for user 101 working to identify a compelling user experience.

In an example, by tracking user interactions and choices, widget recommendation program 104 can identify user preferences in terms of features user 101 prefers when choosing widgets and components. Widget recommendation program 104 can drive additional recommendations via a favorite machine learning algorithm, for example, a collaborative filter. In another example, on a content platform where user 101 edits and deploys user experiences on the same platform, widget recommendation program 104 may collect user inputs provided to, for example, user interface forms, radios and sliders. Widget recommendation program 104 may then use user 101 input information when recommending components. In another example, as widget recommendation program 104 can identify a widget, widget recommendation program 104 can also identify common groupings of components of the widget. Widget recommendation program 104 can recommend widgets that are commonly found near the widgets currently utilized by user 101. In another example, given the information about components, and given an Application Programming Interface (API) call signature or response, widget recommendation program 104 can align fields or datum required with components, and recommend a user interface widget to render the API content.

Figure 2:
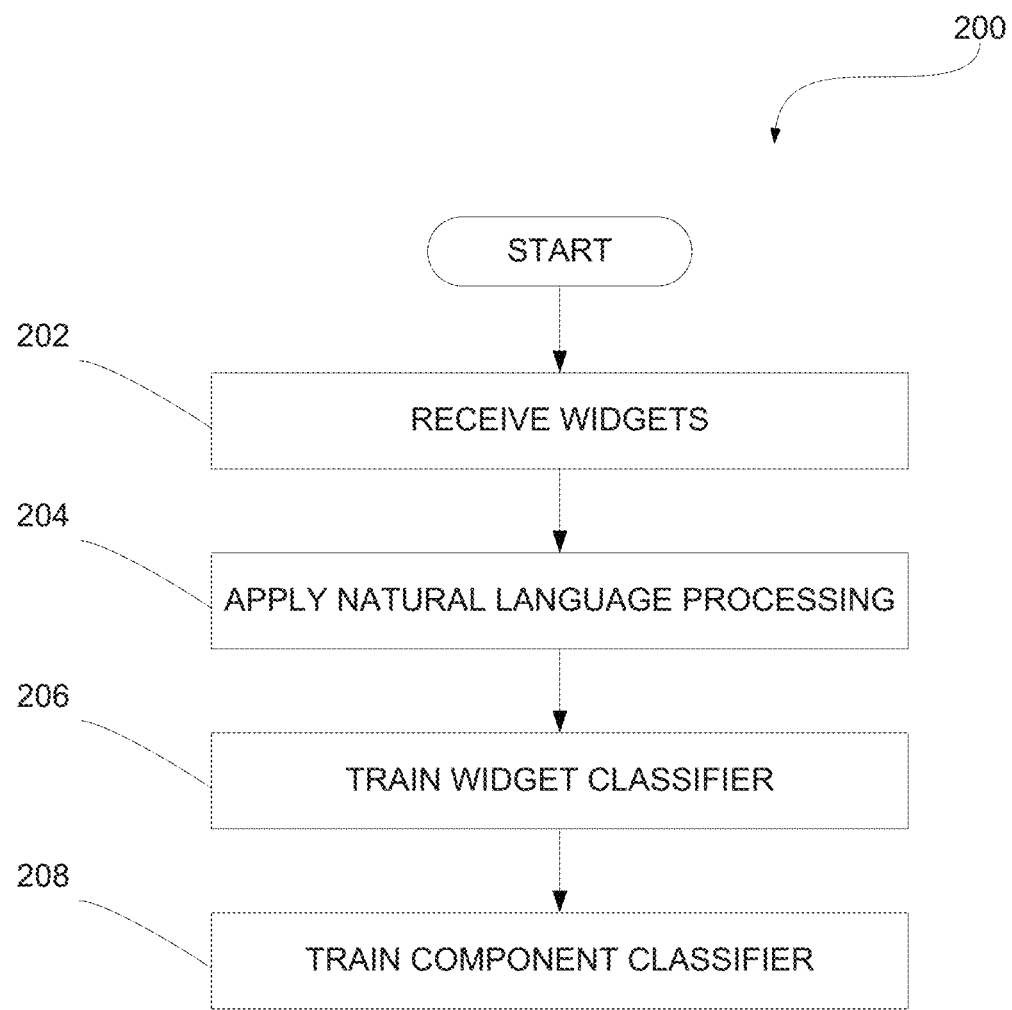
FIG. 2 is a flowchart depicting operational steps of a widget recommendation program within a computing device of FIG. 1, in accordance with an embodiment of the present disclosure.

FIG. 2 is a flowchart 200 depicting operational steps of widget recommendation program 104, in accordance with an embodiment of the present disclosure.

Widget recommendation program 104 operates to receive a plurality of widgets from widgets database 110. Widget recommendation program 104 also operates to apply natural language processing to the plurality of widgets to determine features where the features include contexts and layouts associated with the plurality of widgets. Widget recommendation program 104 also operates to train widget classifier 105 based on the determined features. Widget classifier 105 predicts a widget type associated with the plurality of widgets. Widget recommendation program 104 further operates to train component classifier 107 based on the widget type associated with the determined features. Component classifier 107 predicts a component type and a component element type associated with the plurality of widgets.

In step 202, widget recommendation program 104 receives a plurality of widgets from widgets database 110. A widget is generally a software application that is designed to provide a specific piece of information or a specific function on demand. A user interface widget is, for example, a software application that a computer user interacts with through direct manipulation to read or edit information about an application. A widget may facilitate a specific type of user-computer interaction and may appear as a visible part of the application's graphical user interface. A widget may include one or more components that perform a specific user function. As discussed above, widgets database 110 is a database that includes widgets from various sources. For example, widgets database 110 may include large libraries of widgets available in open source software projects. Widgets database 110 may include resources of widgets where people select areas in a user interface (e.g., mobile, desktop, or web) and where people provide a name for widgets that they collect.

In step 204, widget recommendation program 104 applies natural language processing to the plurality of widgets to determine features wherein the features include contexts and layouts associated with the plurality of widgets. Natural language processing may include natural language classifying, natural language understanding, optical character recognition, and any other natural language processing techniques with analyzing, understanding, and generating natural human languages to interface with machines, for example, both in written and spoken forms. In an example, contexts are texts associated with the plurality of widgets. In another example, contexts are imagery associated with the plurality of widgets. The features may also include layouts and components of the plurality of widgets.

In an example, the plurality of widgets can be represented and encoded via a declarative syntax, (for example, HTML on the web), or JSX for modern mobile frameworks, (for example, React Native). Widget recommendation program 104 can identify widgets by extracting layouts of the HTML to identify components by identifying grouped items and extracting the labeled text and icons to infer context. Using heuristics, widget recommendation program 104 can identify many different types of widgets. In another example, for non-declarative widgets, widget recommendation program 104 can use computer vision techniques or optical character recognition (OCR) to identify components in the widgets. For example, widget recommendation program 104 can use background color and edge detection to find clusters of elements and the defining widget. This detection can be done by differentiating nearby pixels. Once widget recommendation program 104 identifies a space that the widget occupies, widget recommendation program 104 can use OCR to detect the text in each component of a widget, and thus the associated context.

In step 206, widget recommendation program 104 trains widget classifier 105 based on features which include contexts and layouts associated with the plurality of widgets. Widget recommendation program 104 trains widget classifier 105 to predict a widget type from the contexts and layouts associated with the plurality of widgets as discussed above. For each classified widget, widget recommendation program 104 may extract a feature such as color, font, style, and structural/layout, using the HTML structure or computer vision.

In step 208, widget recommendation program 104 trains component classifier 107 to predict a component type and a component element type of the basic elements such as buttons, input boxes, sliders, and labels. In an example, widget recommendation program 104 provides friendly names to widget classes, locates headers in each class element, and does a majority vote.

Widget recommendation program 104 may present a widget for user 101 based on output from widget classifier 105, component classifier 107, and an input from user 101. When user 101 interacts with widget components during the user interface design, widget recommendation program 104 may identify the location of the user interaction determined by, for example, a mouse click, touch, or eye tracking of user 101. Widget recommendation program 104 may identify and present a nearby widget based on the location of the user interaction for user 101. Widget recommendation program 104 may further extract the nearby widget by edge detection and classification techniques. The identified widget may be an input as a way to further train widget classifier 105 and component classifier 107.

Widget recommendation program 104 may perform an inference operation to identify similar components for the identified widget. In an example, widget recommendation program 104 leverages various machine learning approaches to cluster and collaboratively filter similar components for the identified widget. In an embodiment, widget recommendation program 104 provides suggestions that are similar in both context and layout. In another embodiment, widget recommendation program 104 recommends components with a different layout but similar context. In yet another embodiment, widget recommendation program 104 recommends components with a different context but similar layouts. Recommendations for similar concepts, but different layout and/or color palettes, can be incredibly useful for a user working to identify a compelling user experience.

Figure 3:
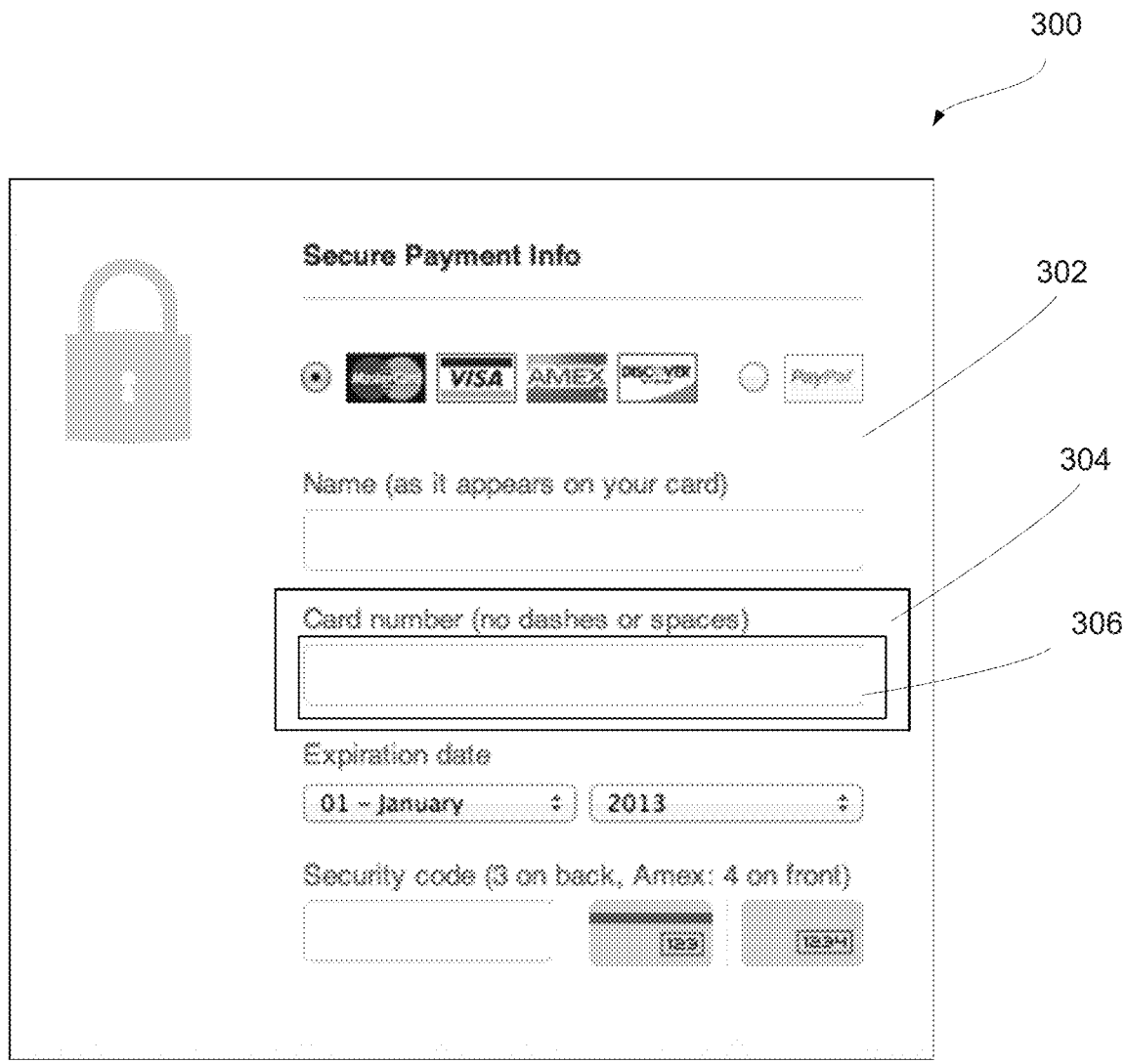
FIG. 3 depicts an example user interface widget, in accordance with an illustrative embodiment of the present disclosure.

FIG. 3 is an example user interface widget 300, in accordance with an illustrative embodiment of the present disclosure.

Widget 302 is an example widget for a secure payment. Widget 302 includes one or more components 304 to perform a specific user function. Each component 306 may include one or more component elements 306.

Figure 4:
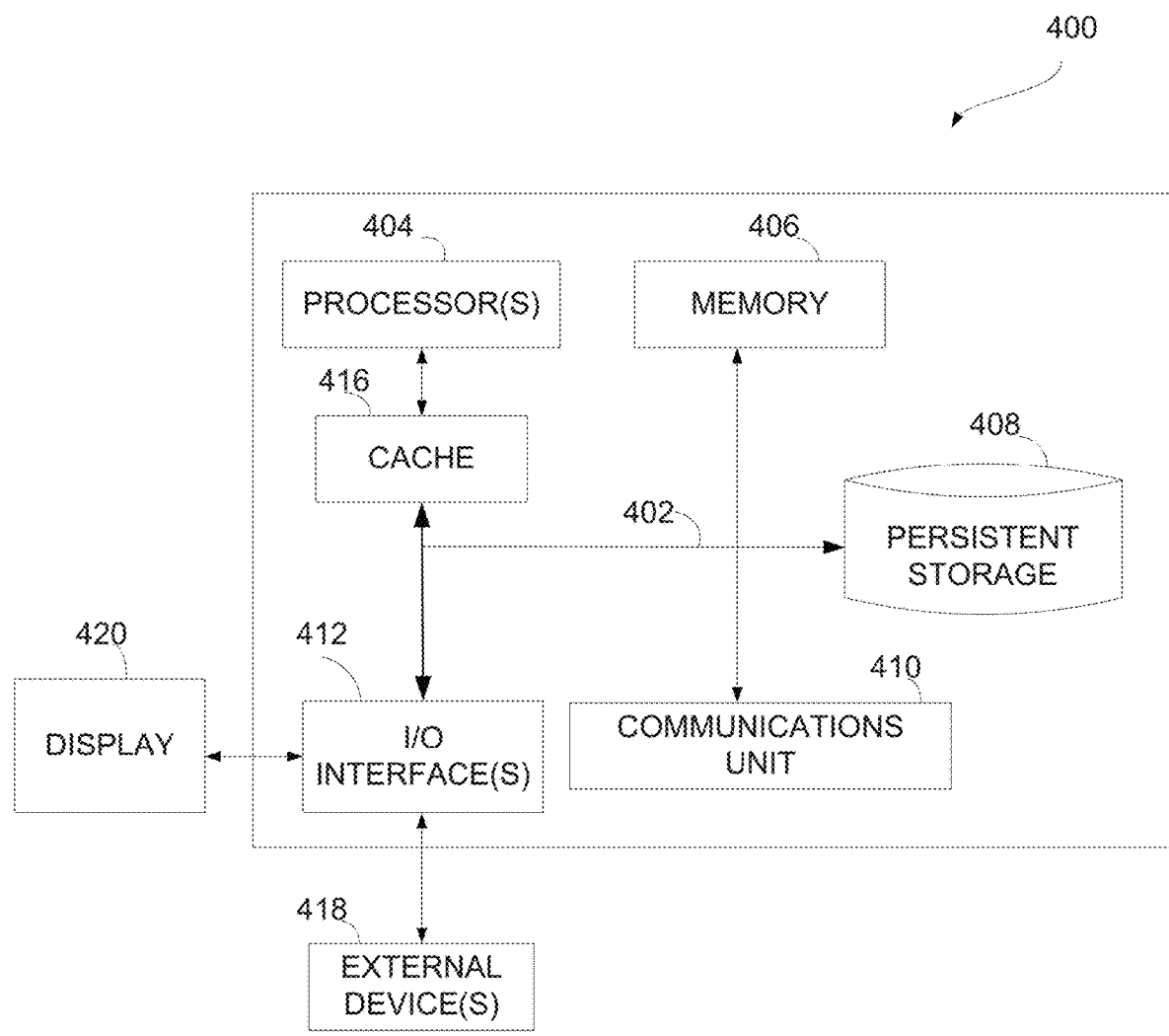
FIG. 4 is a block diagram of components of the computing device of FIG. 1, in accordance with an embodiment of the present disclosure.

FIG. 4 depicts a block diagram 400 of components of computing device 102 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Computing device 102 may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Widget recommendation program 104, widget classifier 105, and component classifier 107 may be stored in persistent storage 408 and in memory 406 for execution by one or more of the respective computer processors 404 via cache 416. In an embodiment, persistent storage 308 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Widget recommendation program 104 may be downloaded to persistent storage 408 through communications unit 410.

I/O interface(s) 412 allows for input and output of data with other devices that may be connected to computing device 102. For example, I/O interface 412 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., widget recommendation program 104 can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
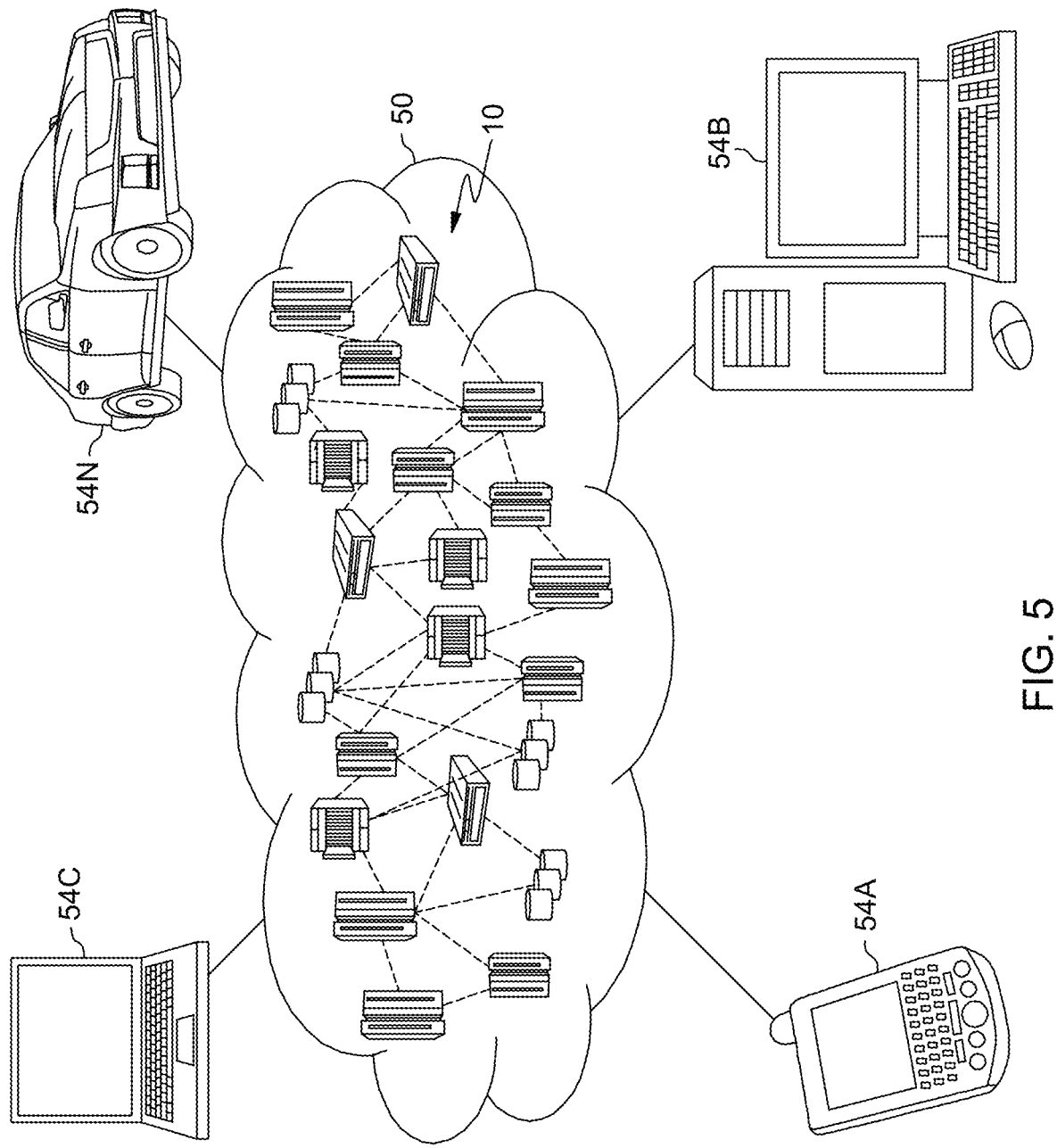
FIG. 5 depicts an embodiment of a cloud computing environment, in accordance with the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
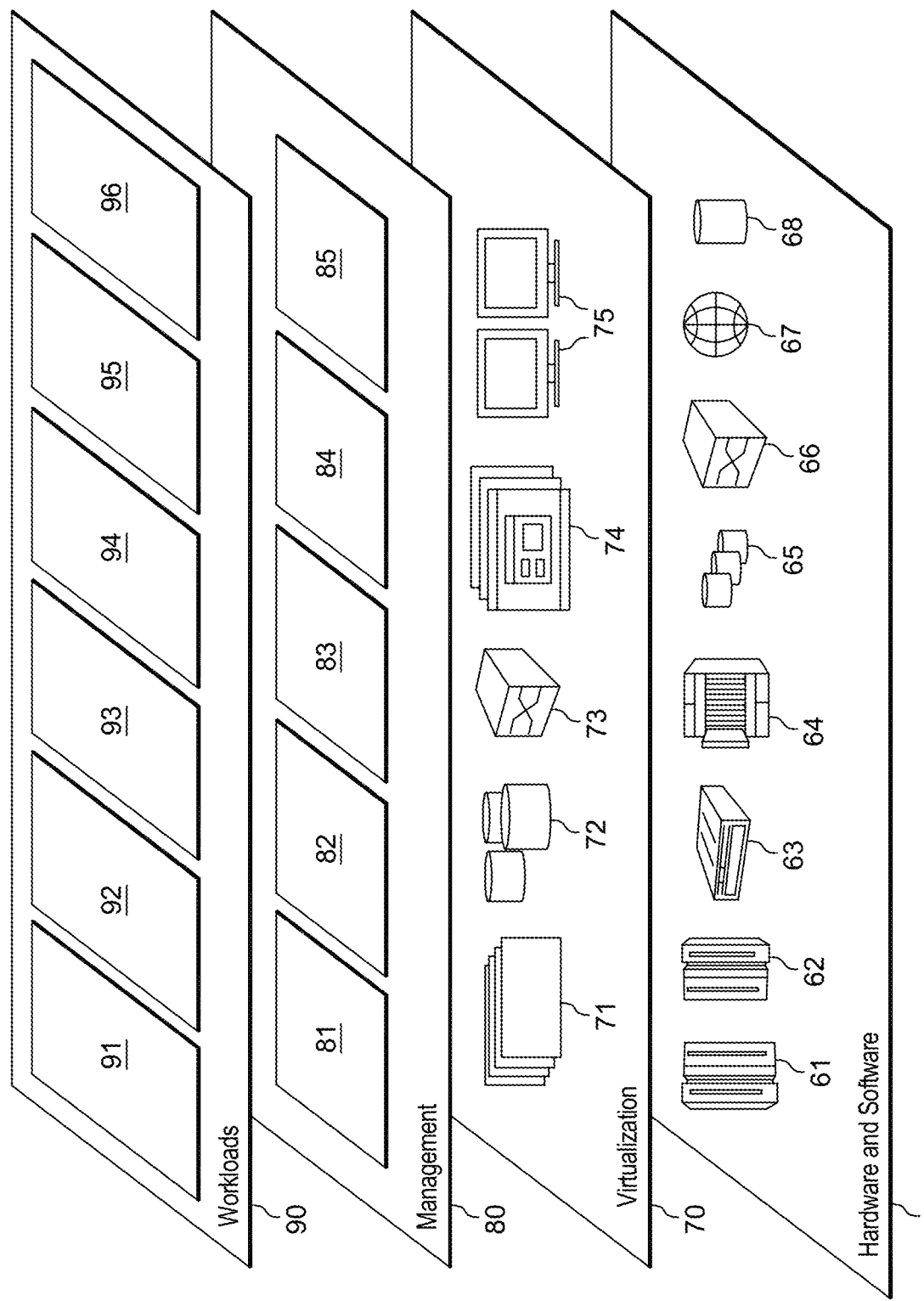
FIG. 6 depicts an embodiment of abstraction model layers of a cloud computing environment, in accordance with the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, widget recommendation program 104, widget classifier 105, and component classifier 107 as described above with respect to user interface development environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   receiving, by one or more processors, a plurality of widgets from one or more sources, each widget including one or more components that perform a specific user function;
   applying, by one or more processors, natural language processing to the plurality of widgets to determine features wherein:
   the features include contexts and layouts associated with the plurality of widgets, and
   applying the natural language processing includes using computer vision techniques: (i) to identify the contexts and layouts for the plurality of widgets which are non-declarative widgets and (ii) to find the non-declarative widgets by using background color and edge detection;

training, by one or more processors, a widget classifier based on the determined features, the widget classifier predicting a widget type;

training, by one or more processors, a component classifier based on the widget type associated with the determined features, the component classifier predicting a component type and a component element type;

presenting, by one or more processors, a first widget to a user based on the trained widget classifier, the trained component classifier, and an input of the user; and performing, by one or more processors, an inference operation to identify a second widget to present to the user.

2. The computer-implemented method of claim 1, wherein applying the natural language processing includes extracting texts and icons to determine the contexts for the plurality of widgets which are represented via a declarative syntax.

3. The computer-implemented method of claim 1, wherein applying the natural language processing includes extracting the layouts for the plurality of widgets which are encoded via HTML.

4. The computer-implemented method of claim 1, further comprising presenting, by one or more processors, the first widget based on a location of a user interaction which is selected from the group consisting of: mouse clicking, touching, and eye tracking.

5. A computer program product for user interface widget recommendation, the computer program product comprising:

one or more computer readable storage media and program instructions stored on the one or more computer readable storage media, the program instructions comprising:

program instructions to receive a plurality of widgets from one or more sources, each widget including one or more components that perform a specific user function;

program instructions to apply natural language processing to the plurality of widgets to determine features wherein:

the features include contexts and layouts associated with the plurality of widgets, and program instructions to apply the natural language processing include program instructions to use computer vision techniques: (i) to identify the contexts and layouts for the plurality of widgets which are non-declarative widgets and (ii) to find the non-declarative widgets by using background color and edge detection;

program instructions to train a widget classifier based on the determined features, the widget classifier predicting a widget type;

program instructions to train a component classifier based on the widget type associated with the determined features, the component classifier predicting a component type and a component element type;

program instructions to present a first widget to a user based on the trained widget classifier, the trained component classifier, and an input of the user; and program instructions to perform an inference operation to identify a second widget to present to the user.

6. The computer program product of claim 5, wherein program instructions to apply the natural language processing include program instructions to extract texts and icons to determine the contexts for the plurality of widgets which are represented via a declarative syntax.

7. The computer program product of claim 5, wherein program instructions to apply the natural language processing include program instructions to extract the layouts for the plurality of widgets which are encoded via HTML.

8. The computer program product of claim 5, further comprising:

program instructions, stored on the one or more computer-readable storage media, to present the first widget based on a location of a user interaction which is selected from the group consisting of: mouse clicking, touching, and eye tracking.

9. A computer system for user interface widget recommendation, the computer system comprising:

one or more computer processors, one or more computer readable storage media, and program instructions stored on the one or more computer readable storage media for execution by at least one of the one or more computer processors, the program instructions comprising:

program instructions to receive a plurality of widgets from one or more sources, each widget including one or more components that perform a specific user function;

program instructions to apply natural language processing to the plurality of widgets to determine features wherein:

the features include contexts and layouts associated with the plurality of widgets, and program instructions to apply the natural language processing include program instructions to use computer vision techniques: (i) to identify the contexts and layouts for the plurality of widgets which are non-declarative widgets and (ii) to find the non-declarative widgets by using background color and edge detection;

program instructions to train a widget classifier based on the determined features, the widget classifier predicting a widget type;

program instructions to train a component classifier based on the widget type associated with the determined features, the component classifier predicting a component type and a component element type;

program instructions to present a first widget to a user based on the trained widget classifier, the trained component classifier, and an input of the user; and program instructions to perform an inference operation to identify a second widget to present to the user.

10. The computer system of claim 9, wherein program instructions to apply the natural language processing include program instructions to extract texts and icons to determine the contexts for the plurality of widgets which are represented via a declarative syntax.

11. The computer system of claim 9, wherein program instructions to apply the natural language processing include program instructions to extract the layouts for the plurality of widgets which are encoded via HTML.

12. The computer system of claim 9, further comprising:

program instructions, stored on the one or more computer-readable storage media, to present the first widget based on a location of a user interaction which is selected from the group consisting of: mouse clicking, touching, and eye tracking.

* * * * *